United States Patent
Prasad et al.

(10) Patent No.: US 7,054,328 B2
(45) Date of Patent: May 30, 2006

(54) SIGNAL TRANSFER POINT WITH INTERNET PROTOCOL CAPABILITY WITHIN A TELECOMMUNICATIONS NETWORK

(75) Inventors: Shyamal Prasad, Dallas, TX (US); Dennis Niermann, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1051 days.

(21) Appl. No.: 09/911,034

(22) Filed: Jul. 23, 2001

(65) Prior Publication Data

US 2003/0016684 A1    Jan. 23, 2003

(51) Int. Cl.
*H04L 12/28* (2006.01)
*H04L 12/56* (2006.01)

(52) U.S. Cl. .................. 370/410; 370/401; 370/352
(58) Field of Classification Search ................. 370/410, 370/400, 401, 395.31, 395.32, 352, 356, 370/389, 392, 475, 474, 465, 466, 467

See application file for complete search history.

(56) References Cited

U.S. PATENT DOCUMENTS

| | | | |
|---|---|---|---|
| 6,324,183 B1 * | 11/2001 | Miller et al. | 370/467 |
| 6,366,576 B1 * | 4/2002 | Haga | 370/352 |
| 6,831,902 B1 * | 12/2004 | Dougherty et al. | 370/328 |
| 2001/0049730 A1 * | 12/2001 | Brendes et al. | 709/223 |
| 2002/0023152 A1 * | 2/2002 | Oguchi | 709/223 |
| 2003/0161301 A1 * | 8/2003 | Sprague et al. | 370/352 |

FOREIGN PATENT DOCUMENTS

WO    WO 00 19758 A    4/2000
WO    WO 01 414 76 A   6/2001

* cited by examiner

*Primary Examiner*—Brian Nguyen

(57) ABSTRACT

A signal transfer point (STP) within a Signaling System 7 (SS7) telecommunications network receives SS7 signals transmitted by a local switch. In response to a determination that the destination node specified by the received SS7 signal is connected to an Internet Protocol (IP) network, the serving STP encapsulates the received SS7 signal within an IP packet and transmits the IP packet over an IP network using an IP address identifying an application service provider (ASP) associated with a STP serving the specified destination local switch as the destination address. All other SS7 signals are transmitted over an existing SS7 telecommunications network.

19 Claims, 9 Drawing Sheets

SIGNAL TRANSFER POINT WITH INTERNET PROTOCOL CAPABILITY WITHIN A TELECOMMUNICATIONS NETWORK

BACKGROUND OF THE INVENTION

1. Technical Field of the Invention

The present invention relates to telecommunications networks and, in particular, to routing Signaling System 7 (SS7) over an Internet Protocol (IP) based communications network.

2. Description of Related Art

A typical telecommunications switch or exchange is a complex digital processor comprising a vast number of devices, signal terminals and, most importantly, software and hardware modules for providing telecommunications services to telecommunications users. With the development of the aforementioned digital processor and a Common Channel Signaling (CCS) network system, such as a Signaling System 7 (SS7) telecommunications network, a typical telecommunications network is now able to support and transport much more than mere voice data. Such data might include video images, control signals, or application specific information.

Also with the wide proliferation of Internet Protocol (IP) based communications networks, otherwise also known as the Internet, a number of telecommunications vendors and service providers are interworking or interfacing the existing CCS network system with the newly developed IP based communications networks. Such an interface would enable an end user, such as a telecommunications subscriber, to communicate multimedia data over a packet based communications network rather than over a conventional CCS network system. Such an interface provides a number of advantages such as higher bandwidth connections. As an illustration, a first Public Switched Telephone Network (PSTN) subscriber connected to a first local switch communicates with a second PSTN subscriber connected to a second local switch over an IP network using a higher bandwidth connection than conventionally available over an SS7 telecommunications network. Such an interconnection is further advantageous since it is more economical to provide an IP connection than to establish or maintain an SS7 telecommunications network.

Now referring to FIG. 1, a block diagram of a local switch connected to an Internet Protocol (IP) based communications network using an interworking function (IWF) is illustrated. A local switch 10A serving a plurality of subscriber terminals (not shown in FIG. 1) determines whether a destination node, such as a destination local switch 10B, is communicable over an IP network 110. In response to such a determination, the local switch communicates with an interworking function (IWF) 35A via an interface (IT) 37A to convert the SS7 signal to acceptable IP format and transmits the data over the IP network 110 to another IWF 35B connected to the destination local switch 10B. The actual mechanism and the specifications for converting or encapsulating the SS7 signal within an IP packet will not be disclosed in detail herein. A standardization organization called Internet Engineering Task Force (IETF) has formed working group Signal Transport (SIGTRAN) within its Transport Area to formulate and implement the necessary specifications for transporting SS7 signal over an IP transport network. All such standardization specifications as mandated by IETF SIGTRAN working group are fully incorporated by reference herein.

On the other hand, in response to a determination that the destination node is not connected to an IP network, the local switch 10A transmits necessary SS7 signals over to the connected SS7 network over its trunk interface 38A. In a conventional manner, the SS7 telecommunications network then communicates the call setup signal over to the destination local switch 10C for effectuating voice/data communication therebetween.

However, as described above, a digital local switch is a complex and sophisticated processor and it is not desirable to modify or alter an existing local switch to interface or interconnect to the new IP network. Furthermore, such a change at the switch level requires each and every local switch within a particular telecommunications network to be modified to interface to the IP IWF 35A. Lastly, it fails to utilize the reliability and robustness that is already provided within the existing SS7 telecommunications network. Accordingly, there is a need for a network solution wherein local switches transparently connect and interface with IP networks without requiring undesirable or complex changes therein.

SUMMARY OF THE INVENTION

The present invention provides a method and apparatus for interfacing or connecting local switches within SS7 telecommunications networks with packet based Internet Protocol (IP) communication networks utilizing Signal Transfer Points (STPs) as interworking function (IWF).

In one embodiment, the present invention provides a system and method for receiving local switch transmitted SS7 signals by a serving Signal Transfer Point (STP) and determining whether the destination node specified by the received SS7 signal is addressable over a connected IP network.

In another embodiment, the present invention provides a system and method for determining the IP address for an application service provider (ASP) associated with a destination STP serving a specified destination local switch;

In another aspect, the present invention provides a system and method for encapsulating SS7 signals into IP packets and transporting the IP packets over an IP network by a Signal Transfer Point (STP) serving a particular local switch within an SS7 telecommunications network.

In still another aspect, the present invention provides a system and method for maintaining two separate routing tables for routing SS7 signals over an IP network as well as SS7 telecommunications network.

In yet another aspect, the present invention provides a system and method for updating a plurality of STPs and associated IP routing tables by a centralized server connected to said plurality of STPs via an IP network.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
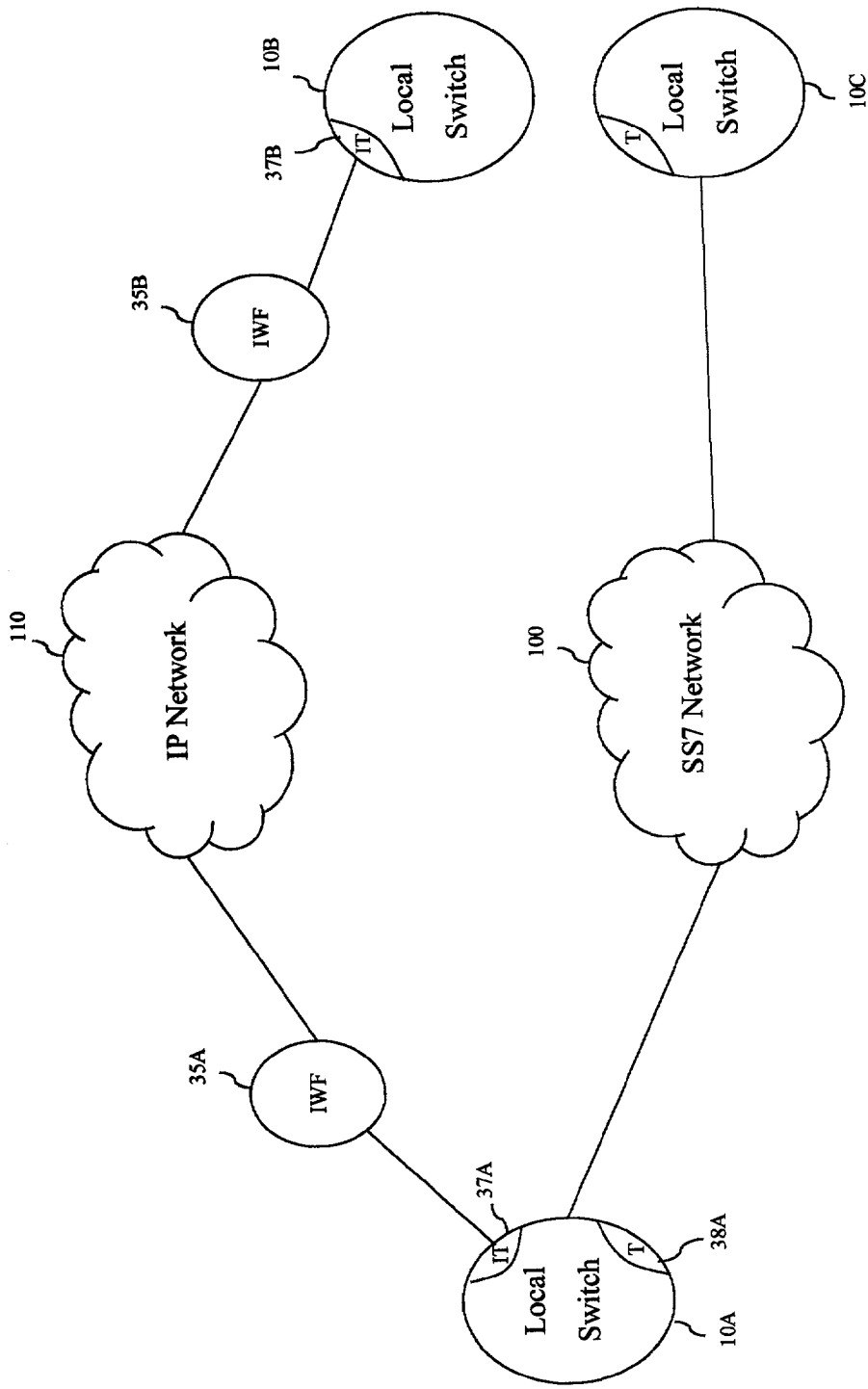
FIG. 1 is a block diagram of a local switch connected to an Internet Protocol (IP) based communications network using an interworking function (IWF)
Figure 2:
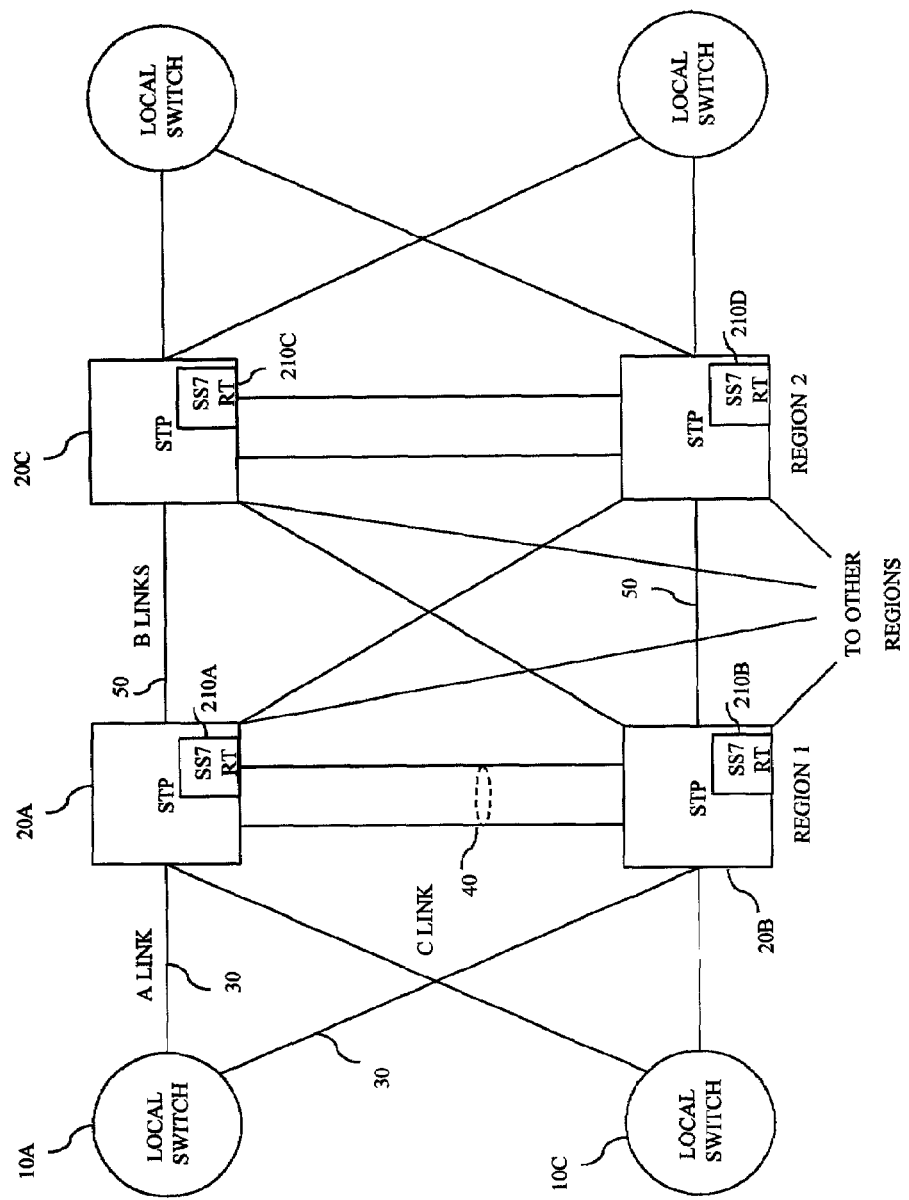
FIG. 2 is a block diagram of a Signaling System 7 (SS7) based telecommunications network.

FIG. 2 is a block diagram of a typical SS7 telecommunications network. As illustrated, the CCS-SS7 network is fully connected for reliability and robustness. The United States, for example, is divided into ten (10) regions and each of the ten regions has at least two interconnected and duplicated Signal Transfer Points (STPS) 20A and 20B. As illustrated, the regional STP 20A is augmented by the area STP 20B for reliability. The A-link 30 provides access to the SS7 network from a local switch 10 where the local switch 10A is also connected to both STPs 20A and 20B for reliability. The STPs, such as 20A and 20C located within different regions in the network are themselves interconnected by so called B-links 50, while duplicate STPs in a region are connected by C-links 40. The hierarchy of the CCS-SS7 architecture allows the addition of a new node or switch to the network with minor adjustments. Because each region is also supported by two STPs and two A-links and B-links as illustrated, it provides great reliability and robustness. If a particular STP or an associated link goes down or becomes unavailable, the network reroutes the data and maintains its network reliability automatically. Also, because of its addressing mechanism and global title translation provided within its routing table (RT) 210A–D, a local switch transmits data without needing to know exactly where the destination switch is located.

Figure 3:
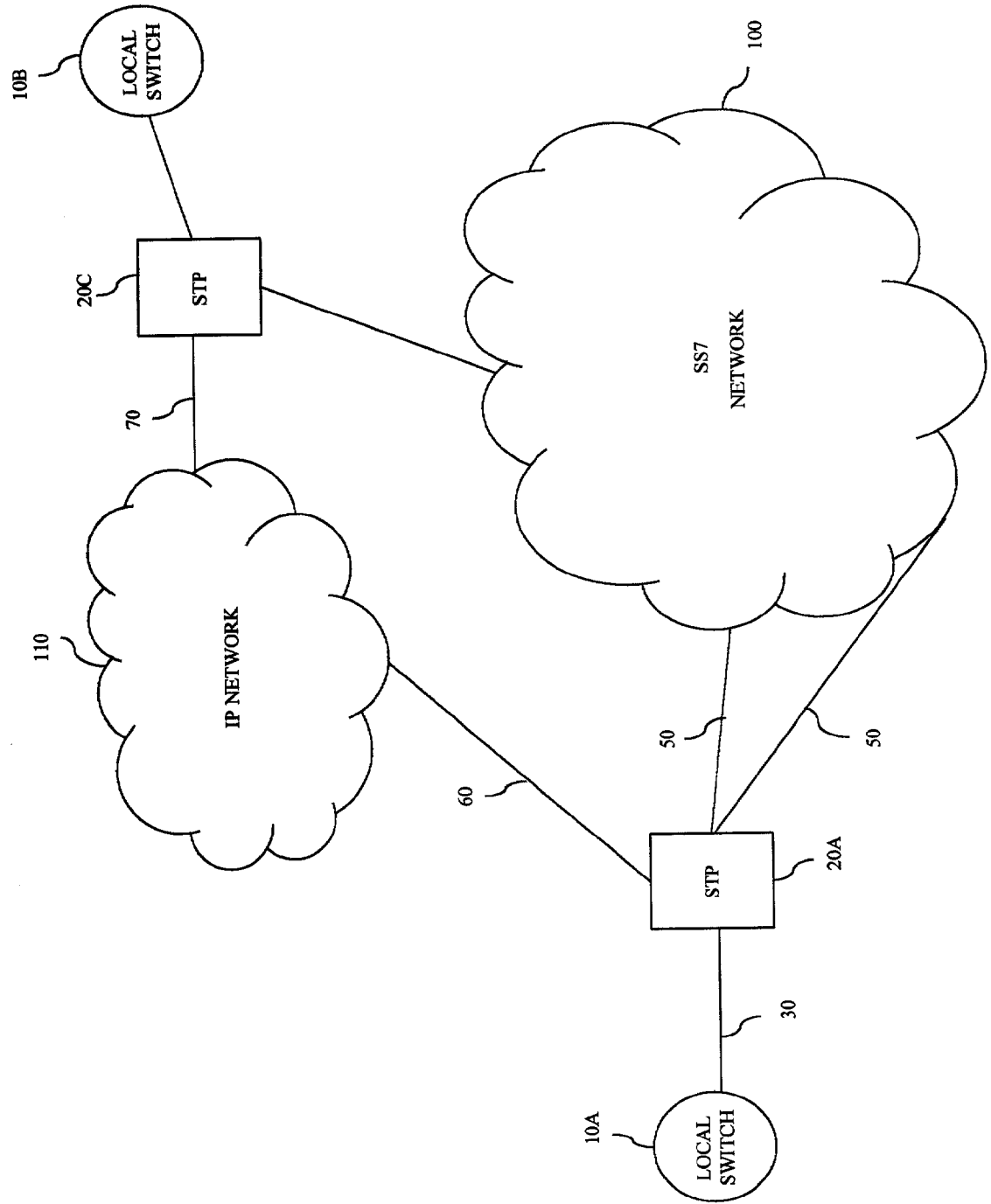
FIG. 3 is a block diagram illustrating the connection of a local switch to an IP based communications network using a signal transfer point (STP) in accordance with the teachings of the present invention.

FIG. 3 is a block diagram illustrating the connection of a local switch 10A to an IP based communications network 110 using a signal transfer point (STP) 20A in accordance with the teachings of the present invention. In order to fully utilize the signal address translation mechanism within an existing SS7 telecommunications network and to avoid the need for making changes within local switches, the local switch 10A interfaces with an associated STP 20A in a conventional manner. As fully described above, each local switch 10A is connected to a pair of STPs for reliability, but only one STP is illustrated herein for simplicity.

The STP 20A is, in turn, connected to the serving SS7 telecommunications network using a pair of B-links 50 in a conventional manner as well. However, in accordance with the teachings of the present invention, the serving STP 20A is further connected to the IP network 110 using an IP connection 60, such as an Ethernet connection link as illustrated. When an SS7 signal is received from the original local switch 10A over a trunk interface 30, the original STP 20A first determines whether the destination address specified by the received SS7 signal is addressable or reachable over the connected IP network 110. In response to a determination that the specified destination node is also connected to the IP network, the original STP 20A transforms the received SS7 signal to be transportable over the IP network 110 and transmits the newly created IP packets to an STP 20C serving the destination local switch 10B. Upon receiving the IP packets transmitted by the originating STP 20A, the destination STP 20C decapsulates the received SS7 data and forwards the received SS7 signals over to the specified destination local switch 10B.

Accordingly, all of the functions and determinations performed by the originating and destination STPs have been performed transparently to the two local switches and the two local switches communicate SS7 signal in a conventional manner without knowing or realizing that the signals have been alternatively transmitted over a different IP network.

On the other hand, in response to a determination that the specified destination address is not communicable over the IP network 110, the serving STP 20A communicates the received SS7 signal over a link 50 to the connected SS7 network 100 in a conventional manner.

Figure 4:
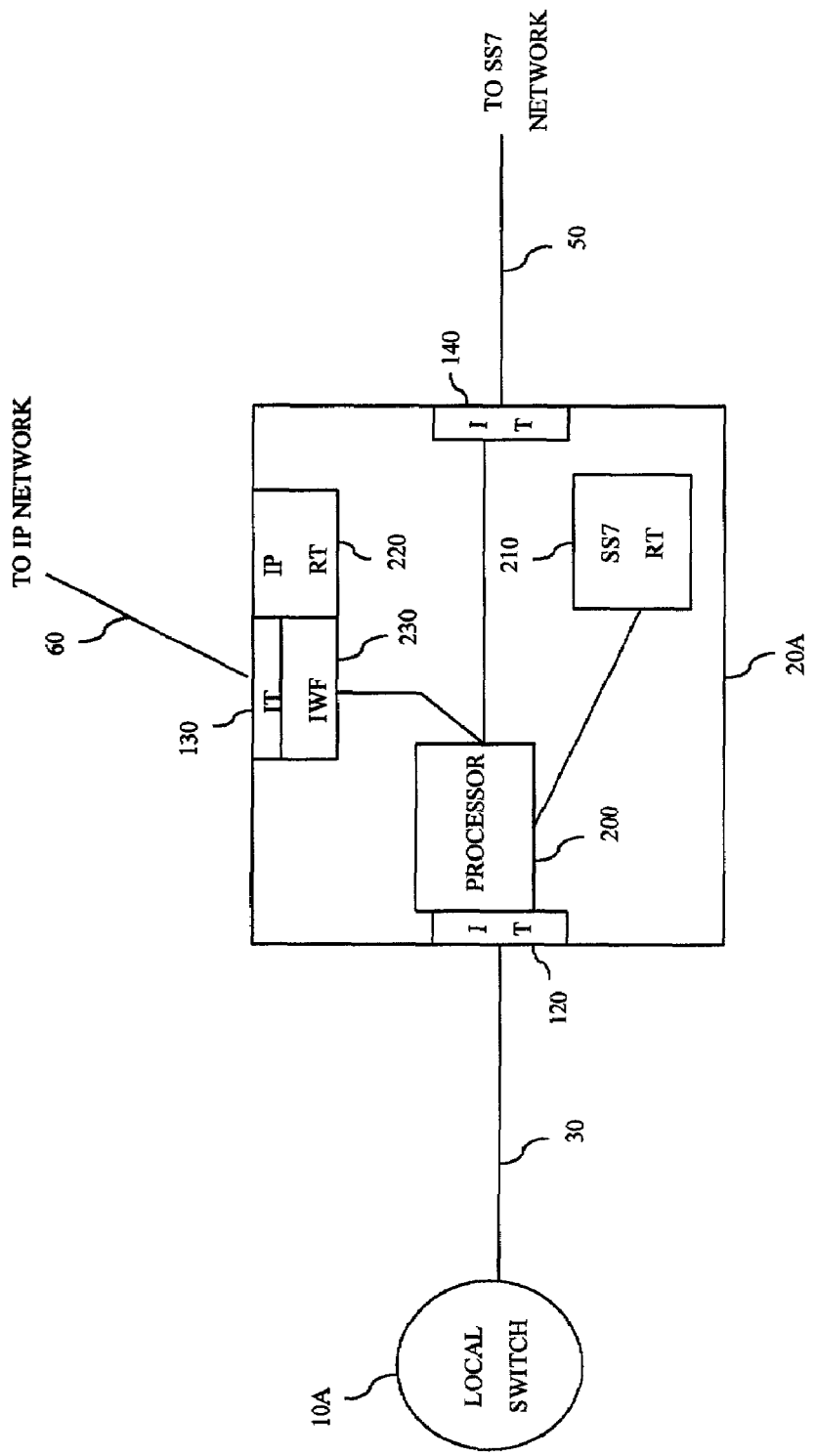
FIG. 4 is a block diagram of a signal transfer point (STP) connected to an IP based communications network in accordance with the teachings of the present invention.

Now referring to FIG. 4, a block diagram of a signal transfer point (STP) connected to an IP based communications network in accordance with the teachings of the present invention is illustrated. A first trunk interface module (IT) 120 within the serving STP 20A provides an interface to the local switch 10A via a trunk interface link 30. As SS7 signals are transmitted by the local switch (also known as end-office and exchange), a processor 200 associated with the first interface module 120 determines whether a destination node specified within the received SS7 signal is addressable over a connected IP network. In accordance with the teachings of the present invention, the processor first reviews the SS7 routing table (RT) 210 to determine the routing context associated with the routing code specified by the received SS7 signal as the destination address. As an example, the "upward" routing context indicates that the specified routing code can be identified within a separate IP routing table 220 and thereby indicating that the signal can be communicated over an IP network. On the other hand, the "downward" routing context indicates that the specified routing code needs to be communicated cover an existing SS7 network by referencing the appropriate SS7 point code (PC).

In response to a determination that the specified routing context is upward, the processor 200 then reviews the IP routing table (220) stored within the serving STP 20A. The IP routing table (220) then determines the routing code for the application service provider (ASP) associated with a STP serving the specified destination node and then determines the IP address associated thereto. An interworking function (IWF) module connected to the processor 200 then receives the transmitted SS7 signal and encapsulates the SS7 application layer data within an IP packet using the determined IP address as the destination address. An IP interface (IT) module 130 within the serving STP 20A then transmits the encapsulated SS7 signals over an IP link 60 to the determined ASP in accordance with the teachings of the present invention.

However, in response to a determination that the routing context is downward instead, the processor determines the proper routing code within the SS7 routing table 210 and transmits the SS7 signal over an SS7 link 50 via an SS7 interface (IT) 140 in a conventional manner.

Figure 5:
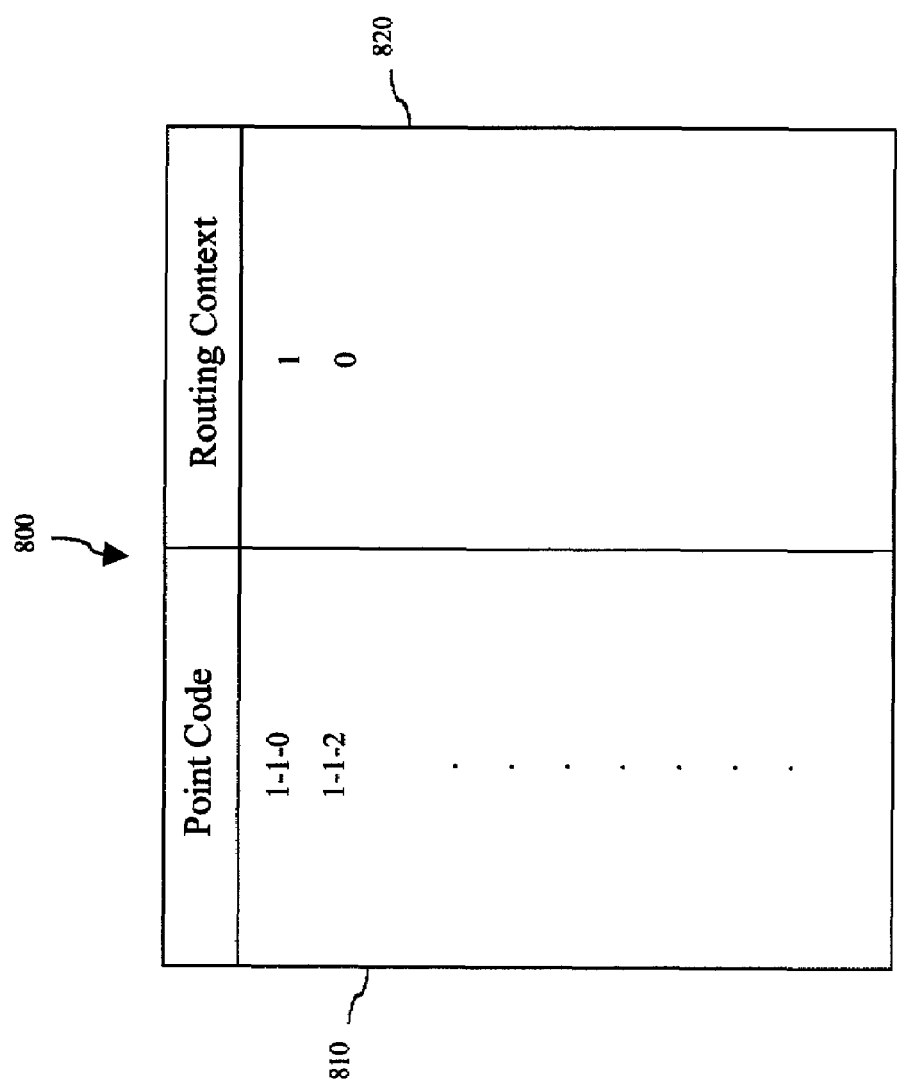
FIG. 5 is a block diagram illustrating the data structure of a routing table associated with a serving STP in accordance with the teachings of the present invention.

FIG. 5 is a block diagram illustrating the data structure of a routing table 800 associated with a serving STP in accordance with the teachings of the present invention. As more fully described in FIG. 4, the processor 200 (not shown in FIG. 5) takes a particular point code associated with a destination node and determines whether the identified destination node is communicable over an associated IP network. In accordance with the teachings of the present invention, a particular point code value 800 is referenced with a routing context. An exemplary implementation of such a reference is disclosed in FIG. 5 wherein a binary value of one (1) 820 indicates that the routing context is "upward" and that the specified routing code 810 can be identified within a separate IP routing table 220. On the other hand, the next routing code 810 is associated with a binary value of zero (0) indicating a downward routing context and that the destination node needs to be communicated over an existing SS7 network. It is to be understood that this routing table 800 may be incorporated within the same SS7 routing table 210 (not shown in FIG. 5) or maintained as a separate routing table within a serving STP.

Figure 6:
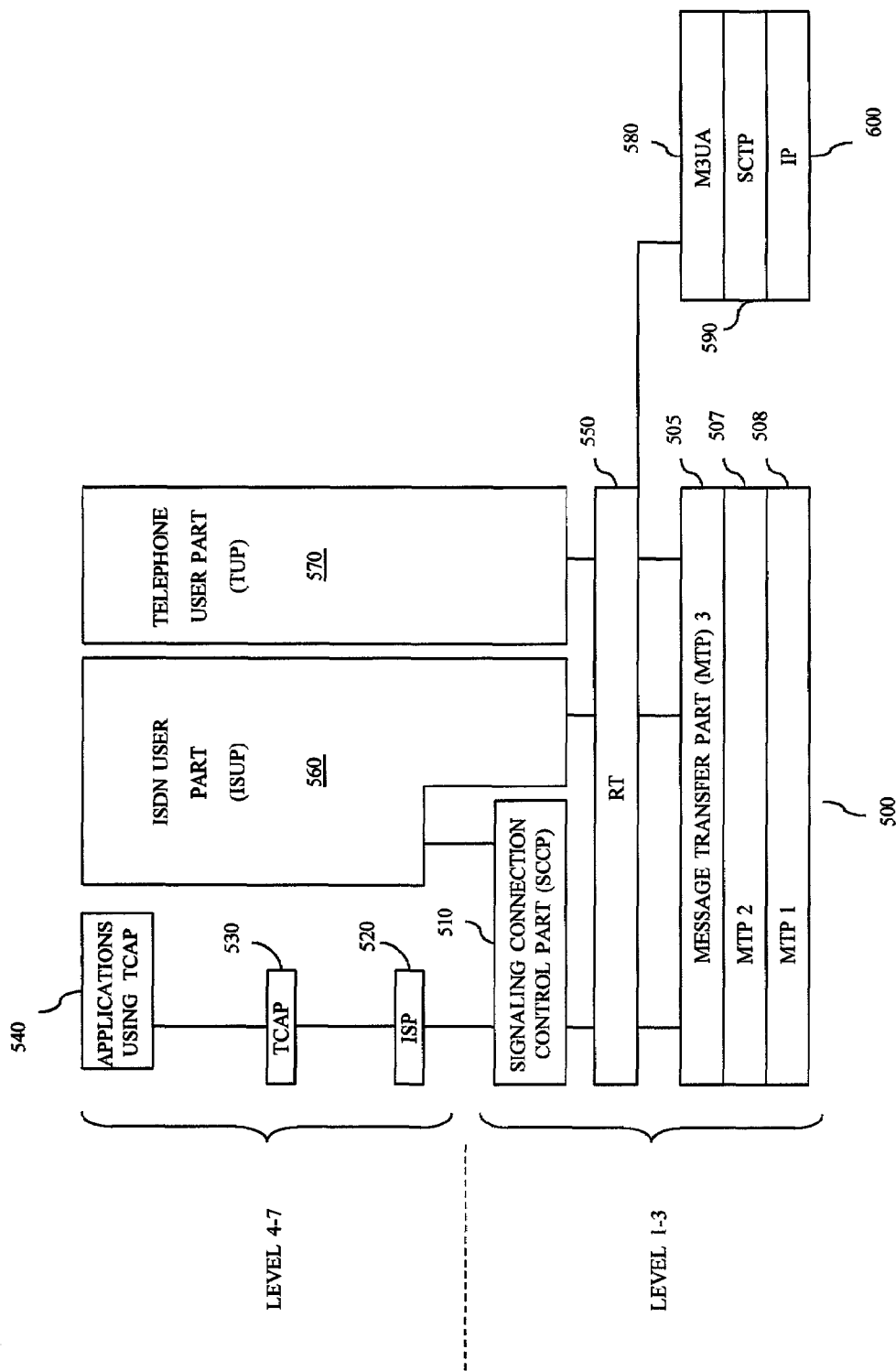
FIG. 6 is a block diagram illustrating the use of IP protocol to communicate SS7 signals in accordance with the teachings of the present invention.

FIG. 6 is a block diagram illustrating the use of IP protocol to communicate SS7 signals in accordance with the teachings of the present invention. As shown in FIG. 6, the SS7 protocol basically has two parts: a user part comprising levels 4–7 and a message part comprising levels 1–3. The user part comes in several varieties, each one corresponding to higher-layer protocols that enable user functions, possibly on dissimilar machines, to communicate with one another. Examples of such user parts include a Telephone User Part (TUP) 570 for basic telephone service, and an Integrated Service Digital Network (ISDN) user Part (ISUP) 560 for providing combined voice, data and video services. These user parts make use of the network delivery services provided by the Message Transfer Part (MTP) 500, which provides a connectionless (diagram-type) but sequenced transport service. The MTP layer 500 is further divided into three levels. The lowest level, MTP level one 508, is equivalent to the OSI physical layer and defines the physical, electrical and functional characteristics of the digital link. Next, MTP level two 507 ensures accurate end-to-end transmission of a message across a signaling link. In essence, the MTP level two 507 implements flow control, message sequence validation and error checking so that when an error occurs on a signaling link, the message (or set of messages) is retransmitted. The final layer of MTP 500, MTP level three 505, provides message routing between signaling points in the SS7 Network. MTP level three 505 reroutes traffic away from failed links and controls traffic when congestion occurs.

The function block labeled Signal Connection Control Point (SCCP) 510 then provides the conversion from the MTP 500 to the network service specified by the Open System Interconnection (OSI) model.

It is apparent from FIG. 6 that different user parts interface with the message transfer part (MTP) 500 at different points in the hierarchy. For example, application data level using Transaction Capability Application Part (TCAP) 540 need to interface with the TCAP level 530, the Intermediate Services Part (ISP) 520, and the SCCP 510 to interface with the MTP 500. On the other hand, the ISUP 560 and the TUP 570 interface with the MTP 500 directly. In accordance with the teachings of the present invention, the STP serving a particular local switch uses a routing table 550 interfacing between the MTP 500 and the different user parts and determines that the destination node is reachable over an associated IP network and replaces the MTP 500 portion of the received SS7 signal with the IP transport part. Accordingly, the MTP3 User Adaptation Layer (M3UA) 580, Stream Control Transmission Protocol (SCTP) 590 and Internet Protocol (IP) 600 replace the transport part 500 of the SS7 signal to be transported over the IP network connected to the serving STP. The serving STP performs such a transformation by encapsulating the received SS7 signal within an IP packet using the determined IP address associated with the serving ASP assigned to the destination STP as fully described above.

Figure 7:
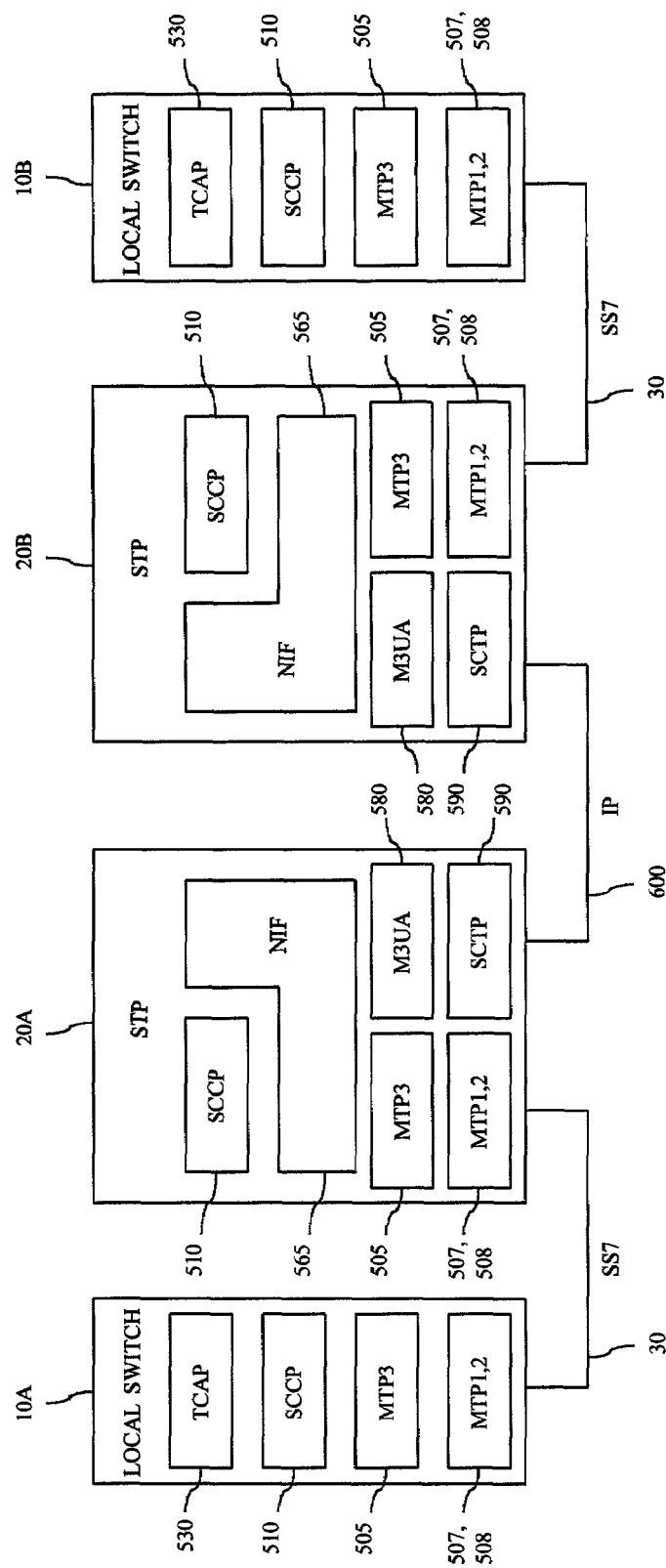
FIG. 7 is a block diagram illustrating the protocol stack for implementing the SS7-to-IP conversion in accordance with the teachings of the present invention.

In FIG. 7, a block diagram illustrating the protocol stack for implementing the SS7-to-IP conversion is shown in accordance with the teachings of the present invention. Essentially the conversion means comprises a set of conversion layers or protocol layers within the STPs 20A, 20B that permit direct peer-to-peer communications between the STPs 20A, 20B. Essentially, the protocol layers provide the SS7 interface and the IP interface within the STPs.

As shown, SS7 signaling traffic is transmitted by a first local exchange 10A to a first STP 20A. Within the local exchange 10A, the TCAP layer 530, SCCP layer 510, MTP3 layer 505, a MTP2 layer 507, and a MTP1 layer 508 are applied to the traffic according to well known protocol standards. The signaling traffic then proceeds through an SS7 link 30 and into STP 10A. STP 10A receives the SS7 signaling traffic and applies MTP1 layer 508, MTP2 layer 507, a MTP3 layer 505, optionally uses SCCP layer 510, Nodal Interworking Function (NF) layer 565, MTP3-User Adaptation Layer (M3UA) 580 and Stream Control Transmission Protocol (SCTP) 590 as appropriate. Alternatively, the local exchange or other signaling end point may utilize ISUP or TUP. NIF Layer 565 within STP 20A serves as the interface between the MTP3 layer 505 and M3UA layer 580. NIF layer 565 has no visible peer protocol within STP 20 but provides network status information to one or both sides of the network.

SCTP 590 is familiar to those skilled in the art. SCTP is a specialized transportation protocol that has been developed for communications applications. SCTP 590 is designed to take the place of TCP, which is commonly used in Internet transactions across an IP network. M3UA 580 is a protocol that supports the transport of any SS7 MTP3-User signaling (e.g., SCCP messages) over an IP network using the services of the SCTP layer 590. Additionally, M3UA layer 580 contains protocol elements enabling a seamless operation of the MTP3-User peers in the SS7 and IP domains. M3UA layer 580 is designed to be used between a signaling gateway and a Media Gateway Controller (MGC) or IP-resident Database. The invention takes advantage of this feature of M3UA to permit IP-enabled end nodes that conform to M3UA/SCTP protocol to inter-operate within the IP network and to support communications over the IP link 60. Thus, the fact that STPs 20A, 20B include M3UA layer 580 ad SCTP layer 590 provides a mechanism for peer-to-peer communications over IP link 60.

Figure 8:
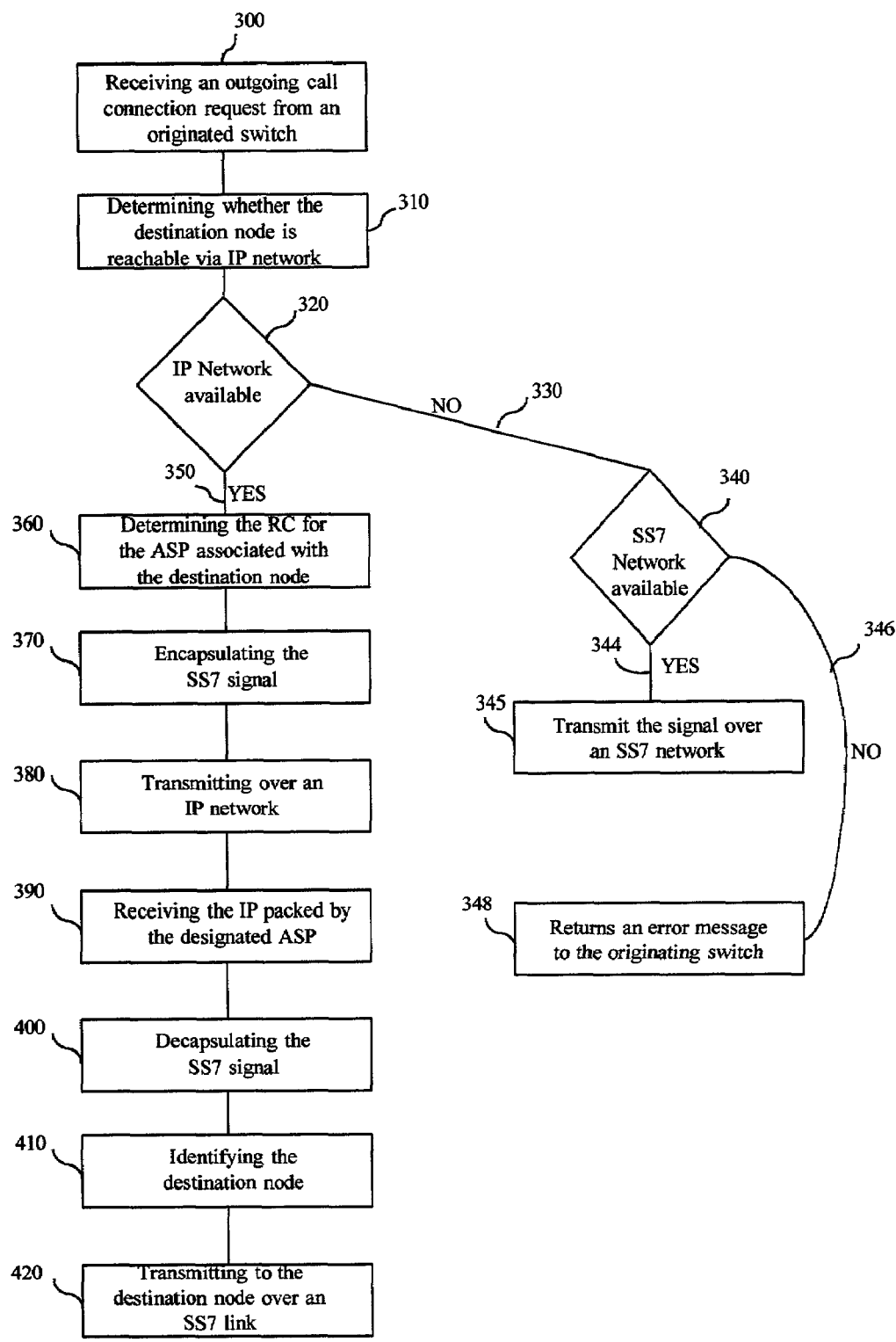
FIG. 8 is a flowchart illustrating the steps performed by an STP to communicate SS7 signal over an IP based communications network in accordance with the teachings of the present invention.

Reference is now made to FIG. 8 illustrating a flowchart with the steps performed by a STP to communicate SS7 signal over an IP based communications network in accordance with the teachings of the present invention. A serving STP connected to a particular local switch within an SS7 telecommunications network receives a SS7 signal, such as an outgoing call connection request at step 300. The serving STP then reviews the associated SS7 routing table to determine whether the specified destination address is reachable by an IP network at step 310. In response to an affirmative determination (decision link 350) that the IP network is available for the destination node at step 320, the serving STP determines the routing code for the Application Service Provider (ASP) associated with a STP serving the specified destination local switch at step 360. Using the IP routing table, the serving STP then determines the IP address associated with the identified ASP. Using the determined IP address for the ASP as the destination address, the STP then encapsulates the received SS7 signal within an IP packet at step 370. The newly created IP packet is then transmitted over the connected IP network at step 380. At the reception end, the destination STP identified by the determined ASP routing code then receives the transmitted IP packet at step 390 and removes the encapsulated SS7 signal data therein at step 400. By reviewing the original destination address stored within the decapsulated SS7 signal, the destination STP thereafter determines the destination local switch at step 410. The destination STP then transmits the SS7 signal over to the identified destination node over an SS7 link at step 420 in accordance with the teachings of the present invention.

On the other hand, in response to a negative determination (decision link 330) that the IP network is not available for the destination node, the serving STP then determines whether an SS7 link is nevertheless available for the specified destination node at step 340. If the destination routing code is specified within the routing table (decision link 344), the serving STP transmits the received SS7 signal over a connected SS7 network at step 345. Lastly, in response to a determination that the specified address is not specified within the routing table stored within the serving STP (decision link 346), the serving SS7 returns a SS7 address error to the originating local switch at step 348.

As an illustration, such SS7 signals communicated by a serving STP includes application layer SS7 packet signals, such as TCAP based protocols that access application services. Such application services include Mobile Application Protocol (MAP) based services or signals, Intelligent Network (IN) invocation of services in an Service Control Point (SCP), or performing a global title (GT) translation service.

Accordingly, in accordance with the teachings of the present invention, other than the STPs intercepting the SS7 signals and rerouting them over an IP network, the local switches are transparent to the IP communication and no changes or modifications are required at the local switch level.

Figure 9:
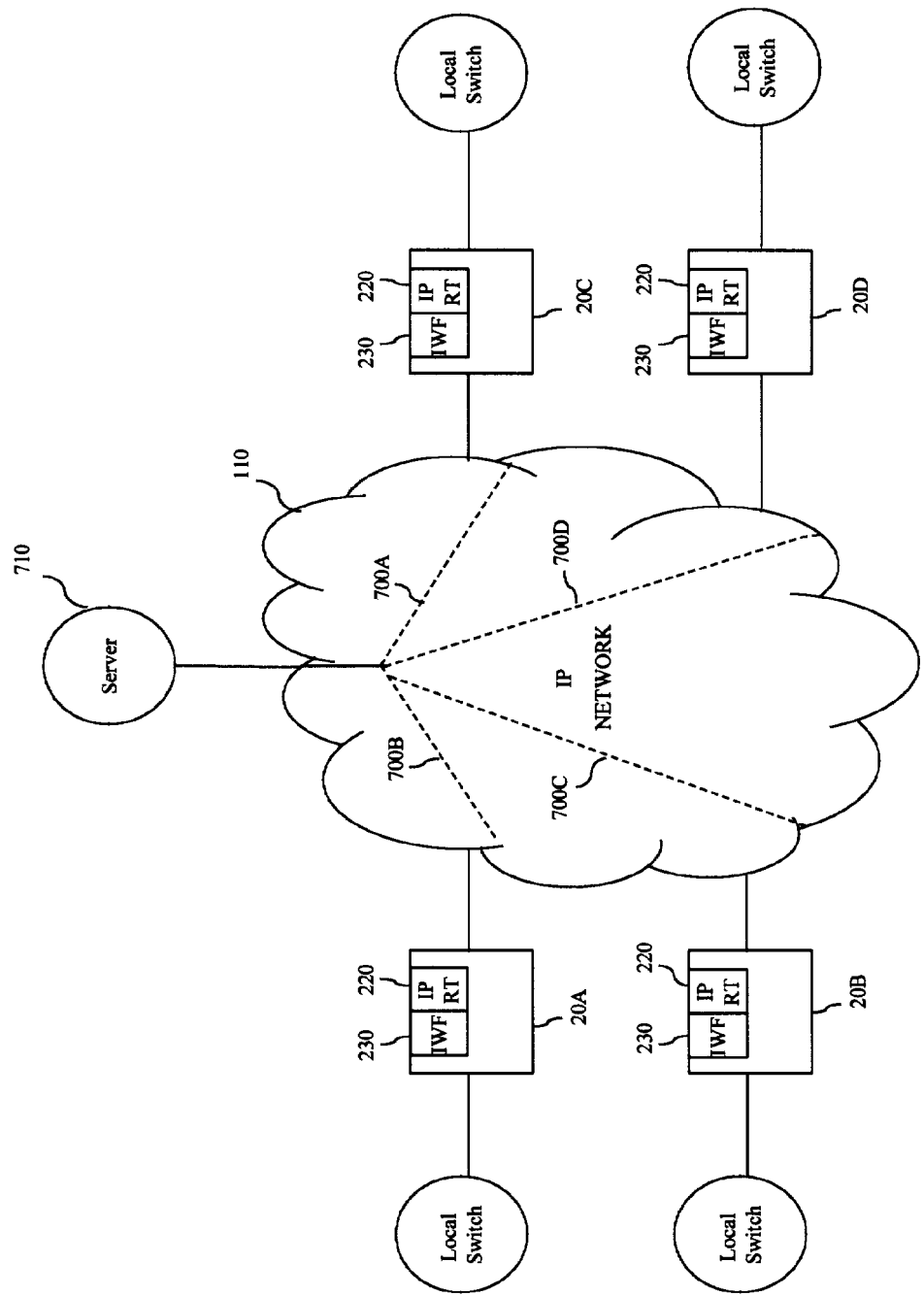
FIG. 9 is a block diagram illustrating a centralized server connected to a plurality of STPs for updating associated routing code address table in accordance with the teachings of the present invention.

FIG. 9 is a block diagram illustrating a centralized server 710 connected to a plurality of STPs for updating associated routing code address tables in accordance with the teachings of the present invention. In order for the serving STPs to properly communicate SS7 signals over an IP network and as new nodes are being connected to the IP network, the IP routing table 220 within each STP 20A–20D needs to be updated on a regular basis. Since IP address data as well as routing code data need to be provided and updated within each routing table, a different mechanism than a conventional IP address updating scheme needs to be utilized. In accordance with the teachings of the present invention, a centralized server 710 broadcasts the updated table on a regular basis to all of the STPs connected to the IP network 110. The IP routing table 220 within each STP 20A–20D connected to the IP network 110 is then replaced with the data received from the update message transmitted by the centralized server 710 over an IP link 700A–D. As fully described above, the interworking function (IWF) 230 residing within the serving STP then utilizes the updated IP address to encapsulate and transmit SS7 signal over an IP network.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A signal transfer point (STP) node within a Signaling System 7 (SS7) telecommunications network serving a particular local switch and further connected to a packet communications network, comprising:
   a first interface for receiving a SS7 signal from said particular local switch, said SS7 signal having a destination address identifying a destination node within said SS7 telecommunications network;
   a first routing table for determining routing mechanism within said SS7 telecommunications network;
   a second routing table for determining routing mechanism within said packet communications network; and
   a processor for determining whether said destination address associated with said received SS7 signal is specified within said second routing table indicating that a destination node specified by said destination address is routeble over said packet communications network and wherein said second muting table includes Internet Protocol (IP) address associated with said destination address specified in the received SS7 signal;
   a second interface for communicating packet data with said packet communications network; and
   an interworking function module connected to said second interface for encapsulating said SS7 signal within a packet and for transmitting said packet using said IP address over said second interface in response to said determination that said destination node is routable over said packet communication network.

2. The signaling transfer point node of claim 1 wherein said interworking function module utilizes Message Transfer Part 3—User Adaptation Layer (M3UA) protocol to communicate said SS7 signal over said packet communications network.

3. The signal transfer point node of claim 1 further comprising:
   a third interface for communicating said received SS7 signal over said SS7 telecommunications network; and
   wherein said processor transmits said received SS7 signal over said third interface in response to a determination that said destination address associated with said received SS7 signal is specified within said first routing table.

4. The signal transfer point node of claim 1 wherein said packet communications network further comprising:
   an address server for maintaining address data for a plurality of communications nodes within said packet communications network;
   a plurality of said STPs connected to said packet communications network; and
   wherein said server communicates said address data to said plurality of STPs over said packet communications network.

5. The signaling transfer point node of claim 1 wherein said first routing table comprises a point code (PC) table for said destination address.

6. The signaling transfer point node of claim 1 wherein said second routing table comprises an Internet Protocol (IP)

address table for a particular signaling transfer point serving a destination local switch associated with said destination address.

7. The signaling transfer point node of claim 1 wherein said first interface comprises a trunk interface with said local switch.

8. A method of communicating a SS7 signal over a packet based communications network wherein said SS7 signal is originated from a local switch connected to a SS7 telecommunications network, comprising the steps of:
receiving a SS7 signal from said local switch at a signal transfer point (STP) node within said SS7 telecommunications network, said SS7 signal indicating a destination address identifying a destination node within said SS7 telecommunications network;
determining at said STP node whether said destination address indicated by said received SS7 signal is specified within a routing code table indicating that said destination address is reachable by said packet based communications network;
in response to said determination that said destination address is specified within said routing code table, routing said SS7 signal over said packet based communications network using a determined routing code as the destination address within said packet based communications network;
otherwise, determining at said STP node whether said destination address Indicated by said received SS7 signal is specified within a point code table indicating that said destination address is reachable by said SS7 telecommunications network; and
in response to said determination that said destination address is specified within said point code table, routing said SS7 signal over said SS7 telecommunications network to said destination node.

9. The method of claim 8 wherein said step of routing said received SS7 signal over said packet based communications network further comprises the steps of:
identifying an Internet Protocol (IP) address associated with a second signal transfer point (STP) serving a destination local switch associated with said received destination address within said routing code table;
encapsulating said received SS7 signal within an Internet protocol (IP) based packet; and
routing said IP packet using said identified IP address associated with said second STP as the destination address over sold packet based communications network.

10. The method of claim 9 further comprises the step of utilizing Message Transfer Part 3—User Adaptation Layer (M3UA) protocol to transmit said received SS7 signal over said packet based communications network and to support peer-to-peer signaling.

11. The method of claim 9 wherein said step of routing said received SS7 signal over said SS7 telecommunications network further comprises the step of said routing said received SS7 signal over said SS7 telecommunications network using a point code specified within said point code table as the destination address.

12. The method of claim 8 further comprising the steps of:
receiving an address update packet signal from a centralized server; and
updating said routing code table with data received within said address update packet signal.

13. The method of claim 12 wherein said SS7 telecommunications network includes a plurality of signal transfer points (STPs), each including said routing code table, wherein each of said STPs further receiving said address update packet signal from said centralized server for updating said routing code table.

14. A system for communicating a SS7 signal over a packet based communications network wherein said SS7 signal is originated from a local switch connected to a SS7 telecommunications network, comprising:
means for receiving a SS7 signal from said local switch at a signal transfer point (STP) node within said SS7 telecommunications network, said SS7 signal indicating a destination address identifying a destination node within said SS7 telecommunications network;
means for determining within said STP node whether said destination address indicated by said received SS7 signal is specified within a routing code table indicating that said destination address is reachable by said packet based communications network;
in response to said determination that said destination address is specified within said routing code table, means for routing said SS7 signal over said packet based communications network using a determined routing code as the destination address within said packet based communications network;
otherwise, means for determining within said STP node whether said destination address indicated by said received SS7 signal is specified within a point code table indicating that said destination address is reachable by said SS7 telecommunications network; and
in response to said determination that said destination address is specified within said point code table, means for routing said SS7 signal over said SS7 telecommunications network to said destination node.

15. The system of claim 14 wherein said means for routing said received SS7 signal over said packet based communications network further comprises:
means for identifying an Internet Protocol (IP) address associated with a second signal transfer point (STP) serving a destination local switch associated with said received destination address within said routing code table;
means for encapsulating said received SS7 signal within an internet protocol (IP) based packet; and
means for routing said IP packet using said identified IP address as the destination address aver said packet based communications network.

16. The system of claim 15 further comprises means for utilizing Message Transfer Part 3—User Adaptation Layer (M3UA) protocol to transmit said received SS7 signal over said packet communications network.

17. The system of claim 15 further comprises means for routing said received SS7 signal over said SS7 telecommunications network using a point code specified in said point code table as the destination address.

18. The system of claim 14 further comprising:
means for receiving an address update packet signal from a centralized server; and
means for updating said routing code table with data received within said address update packet signal.

19. The system of claim 18 wherein said SS7 telecommunications network further comprising a plurality of signal transfer points (STPs), each comprising said routing code table, wherein each of said STPs further comprising means for receiving said address update packet signal from said centralized server for updating said routing code table.

* * * * *

UNITED STATES PATENT AND TRADEMARK OFFICE
CERTIFICATE OF CORRECTION

PATENT NO. : 7,054,328 B2
APPLICATION NO. : 09/911034
DATED : May 30, 2006
INVENTOR(S) : Prasad et al.

It is certified that error appears in the above-identified patent and that said Letters Patent is hereby corrected as shown below:

Column 8, Line 27, in Claim 1, delete "muting" and insert -- routing --, therefor.

Column 9, Line 47, in Claim 9, delete "sold" and insert -- said --, therefor.

Column 10, Line 45, in Claim 15, delete "aver" and insert -- over --, therefor.

Signed and Sealed this

Eighteenth Day of December, 2007

JON W. DUDAS
*Director of the United States Patent and Trademark Office*